May 1, 1962 G. O. CONNER 3,031,700
WORK HOLDING TURRET FOR FORMING MACHINES
Original Filed March 12, 1951 11 Sheets-Sheet 1

INVENTOR.
GUY O. CONNER
BY W. H. Woodley
ATTORNEY

INVENTOR.
GUY O. CONNER
BY W. H. Woodlief
ATTORNEY

May 1, 1962  G. O. CONNER  3,031,700
WORK HOLDING TURRET FOR FORMING MACHINES
Original Filed March 12, 1951  11 Sheets-Sheet 3

INVENTOR.
GUY O. CONNER
BY
W. H. Woodlief
ATTORNEY

INVENTOR.
GUY O. CONNER
BY W.H. Woodlief
ATTORNEY

May 1, 1962 G. O. CONNER 3,031,700
WORK HOLDING TURRET FOR FORMING MACHINES
Original Filed March 12, 1951 11 Sheets-Sheet 5
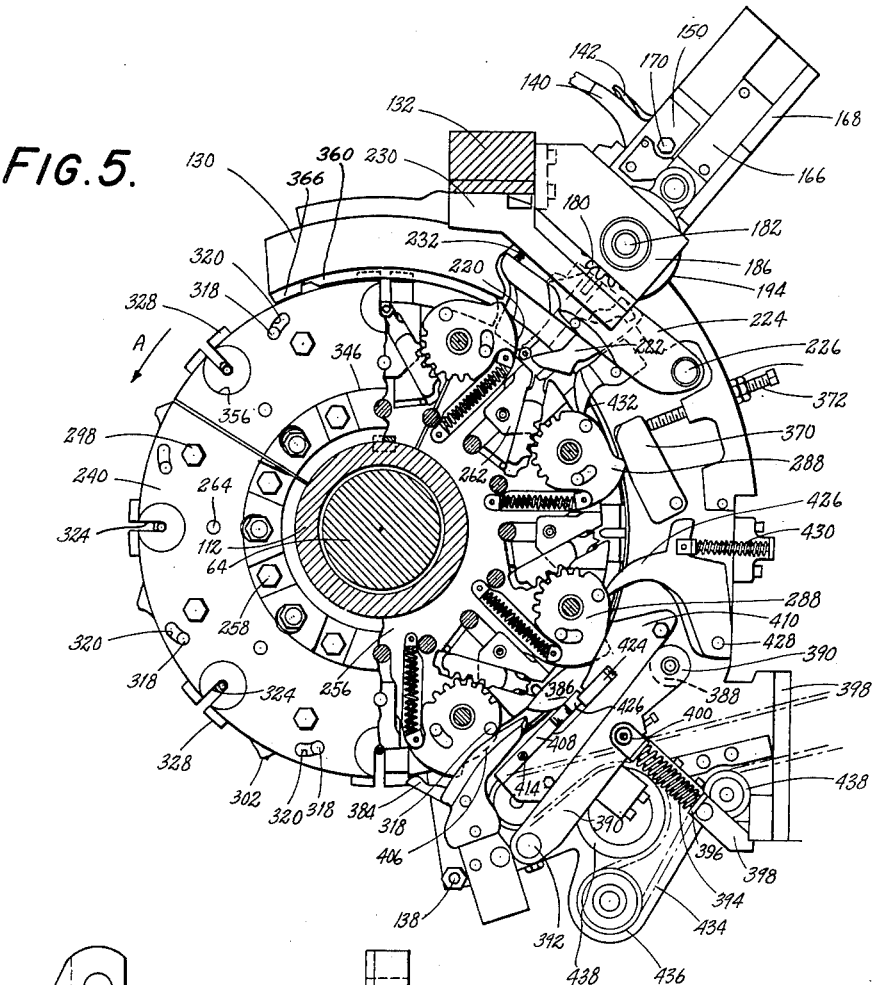
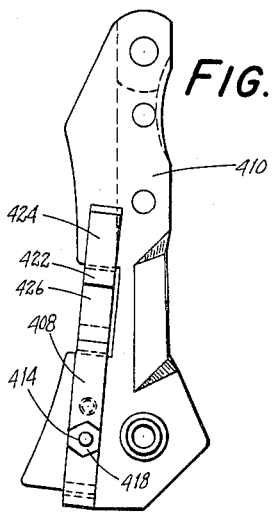
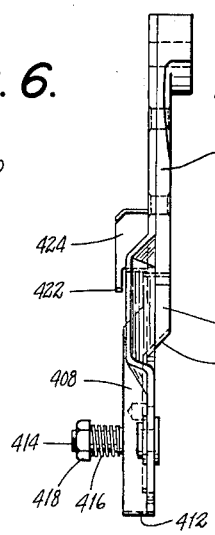
INVENTOR.
GUY O. CONNER
BY W. H. Woodlief
ATTORNEY May 1, 1962

G. O. CONNER 3,031,700

WORK HOLDING TURRET FOR FORMING MACHINES

Original Filed March 12, 1951

INVENTOR.
GUY O. CONNER
BY
W. H. Woodlief
ATTORNEY

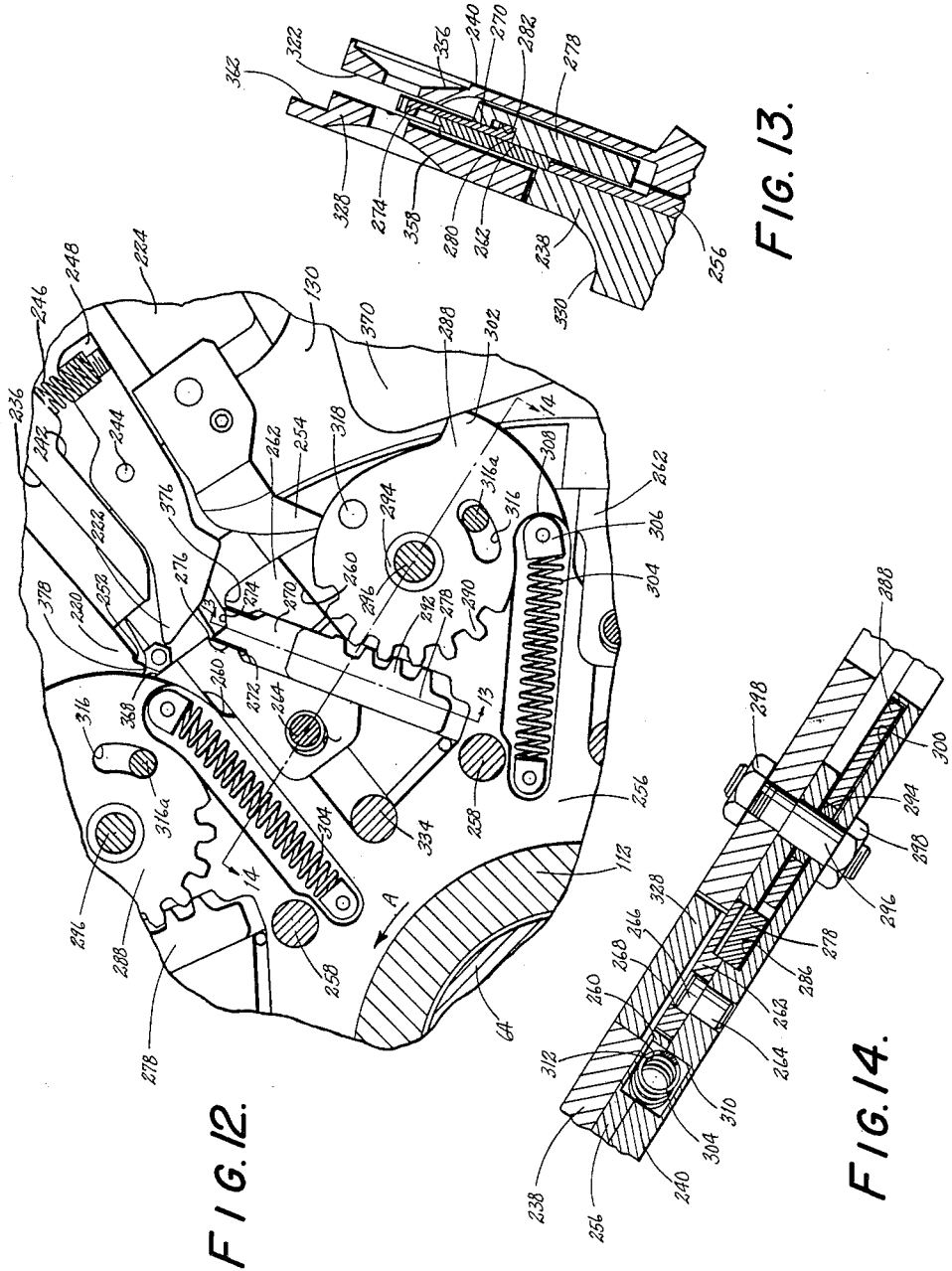

May 1, 1962 G. O. CONNER 3,031,700
WORK HOLDING TURRET FOR FORMING MACHINES
Original Filed March 12, 1951 11 Sheets-Sheet 9

INVENTOR.
GUY O. CONNER
BY W. H. Woodlief
ATTORNEY

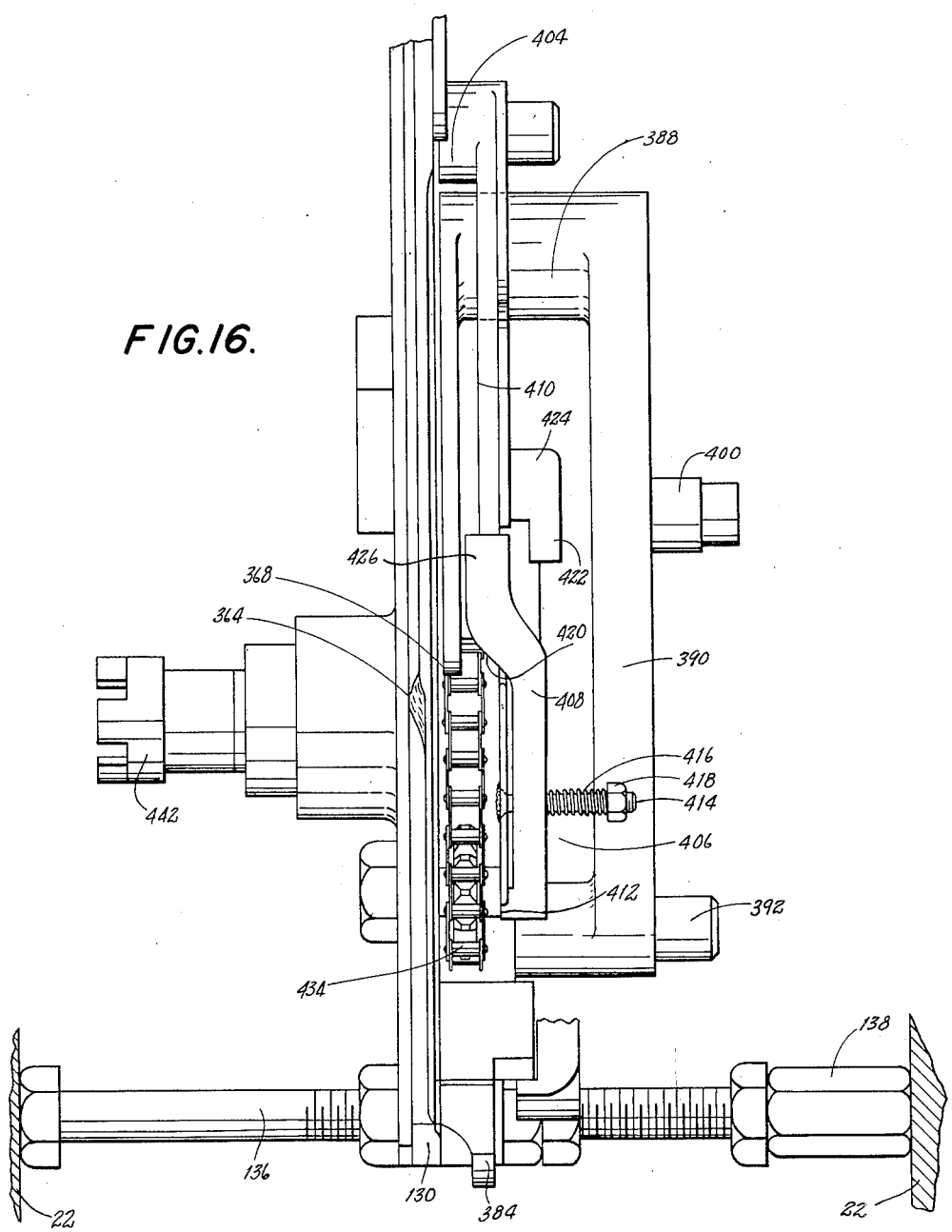

May 1, 1962 G. O. CONNER 3,031,700
WORK HOLDING TURRET FOR FORMING MACHINES
Original Filed March 12, 1951 11 Sheets-Sheet 11

INVENTOR.
GUY O. CONNER
BY W. H. Woodley
ATTORNEY

United States Patent Office 3,031,700
Patented May 1, 1962

3,031,700
WORK HOLDING TURRET FOR FORMING
MACHINES
Guy O. Conner, Cleveland, Ohio, assignor to Republic Steel Corporation, Cleveland, Ohio, a corporation of New Jersey
Original application Mar. 12, 1951, Ser. No. 215,131, now Patent No. 2,828,492, dated Apr. 1, 1958. Divided and this application Mar. 25, 1958, Ser. No. 723,918
11 Claims. (Cl. 10—162)

This invention pertains to machine tools for forming metal and more particularly to a machine adapted for high speed performance of a variety of operations such as spinning, tapping, drilling or the like. This application for patent is a division of my application for United States patent, Serial Number 215,131, filed March 12, 1951, for Forming Machine, now Patent 2,828,492 dated April 1, 1958.

Current practice in the threading of nuts utilizes a machine in which the tapping tool is bent at the end opposite the working end and is loosely disposed in a complementary recess in the machine. Onto this the nuts are threaded, while the tap is prevented from rotating and is held against longitudinal motion by the bent end. As the nuts are finished, they slide along the tool, around the bent end and off into a receptacle. The cost of these taps is considerable, but other more serious disadvantages are also present. Because of the looseness of the tool in its recess, it has heretofore been virtually impossible to get a fit closer than class 1 or 2 on a nut produced by such methods. The device also is relatively slow and the finish on the threads poor, compared to that on the bolts onto which the nuts are to be threaded.

Many other devices have been proposed for this type of work. In some, the tap was driven in and then reversed to recover the tool. This was expensive both in time and in tool wear, since the tool passed through the workpiece twice for one operation. Other devices used a rotating head having a plurality of vertical spindles. In these, the tap would be driven through the nut, drop into a cup and then be picked up again by the spindle as the nut was moved out of the way. These too, were not entirely satisfactory, partly because the tap could not be held tightly enough to produce an accurate thread.

With the machine of my invention, most of the disadvantages of prior art machines are avoided. In addition, great savings are possible. As an example, a single machine made according to my invention may be made to produce as many nuts in a given time as from 10 to 20 of present day machines. Moreover, by such a device, a single operator may tend each machine where under present day conditions an operator customarily tends two machines. Thus, for a unit labor cost, a machine built according to my invention will produce from five to ten times as many nuts. Further savings are possible in floor space, where my machine requires about the same space as present day machines, and in power. This latter saving amounts to nearly fifty percent based on tests of an eight spindle machine built according to my invention. The total effect of these savings makes possible extremely fast production of the product of the machine at low cost, both in direct cost of the product and in overhead.

In addition to lessened cost, the quality of the product is greatly improved. Where with present day machines nut threads having a fit of class 1 or 2 are ordinarily produced, and a class 3 fit is rare; with a machine of my invention, nuts of class 4 fit may easily be produced, and class 5 fits are not uncommon. In order to achieve this sort of fit, it is obvious that no tearing of metal nor looseness of parts can be allowed. These conditions also make possible a much better finish on the surface of the threads with the resultant advantages of increased strength and ease of threading.

All of these advantages are possible because of my invention which is embodied in a multi-spindle machine having a high speed feed mechanism capable of furnishing work blanks to the machine in a continuous stream. These blanks are held loosely in the machine until properly aligned with the tool at which point they are securely clamped in perfect alignment. The tools are driven through the blank by spindles which are, in turn, governed by cams on the machine. These tools are short and are firmly held at both ends while cutting the thread. The machine therefore eliminates all play in the spindles, tools and the workpiece.

A more complete understanding of the device of the invention, and the invention itself, may be had by reference to the following description and drawings which form a part of this specification.

In the drawings:

FIG. 5 is an enlarged sectional view taken along line 5—5 of FIG. 2;

FIG. 6 is a side elevational view of the lateral stripper device removed from the machine;

FIG. 7 is an edge plan view of the device of FIG. 6;

FIG. 12 is an enlarged detailed view of a portion of FIG. 5;

FIG. 13 is a sectional view along line 13—13 of FIG. 12;

FIG. 14 is a sectional view along line 14—14 of FIG. 12;

FIG. 16 is a view of the discharge mechanism from the periphery of the work holding mechanism on line 16—16 of FIG. 4;

Figure 1:
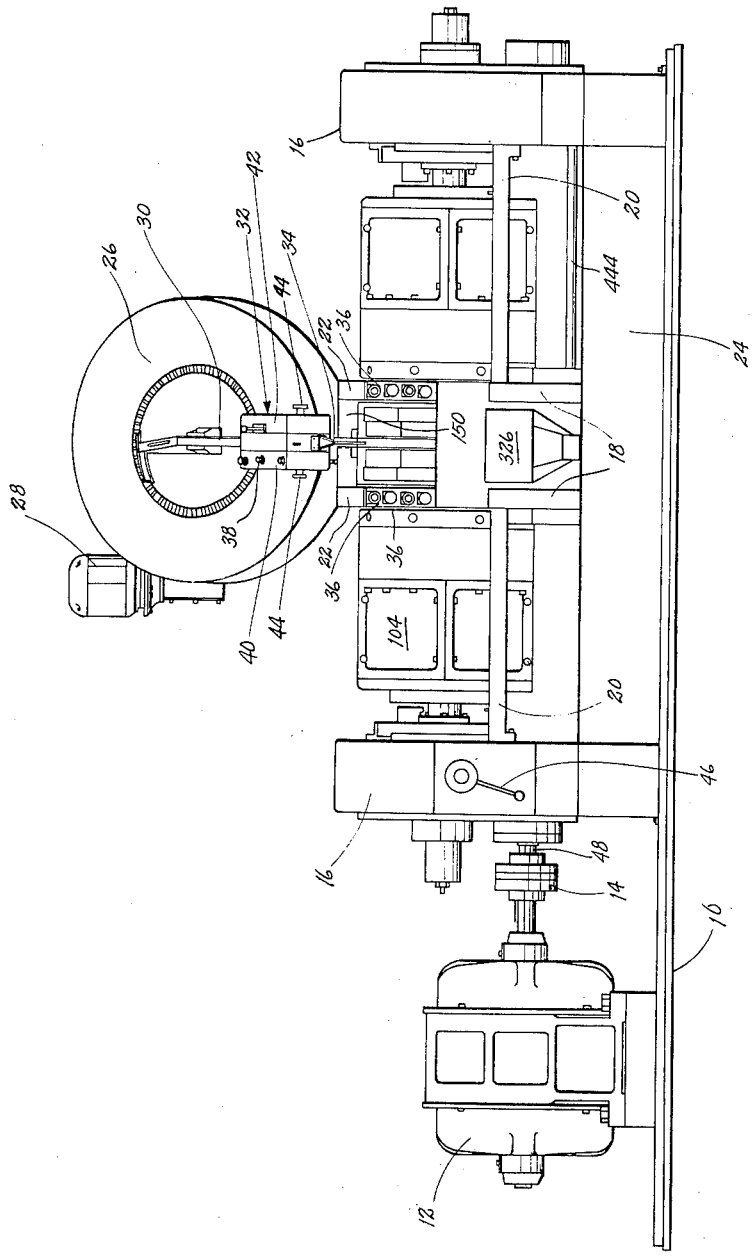
FIG. 1 is a front elevational view of the machine with the covers removed.

Briefly, my invention comprises an automatic machine having one or more horizontal spindles operated from a central shaft. The spindles, in addition to being rotated about the central axis of the machine, revolve to drive a tool and are moved axially by a stationary cam or similarly actuating mechanisms. The spindles are very accurately and firmly located to avoid misalignment or play. The spindles are arranged around the central axis of the machine in two matched sets, each spindle having an axially aligned, matching spindle facing it from the opposite set. Novel tool holding heads are provided for the spindles. These heads are adapted to hold a tool very firmly yet are able to release the tool to be picked up by the opposite head. Cam operated rods extending through the spindles provide positively operated means for passing the tool from one head to another. The tool is provided with shanks at both ends of the thread cutting part for the heads to grasp in order for the tool to be passed in this manner.

The center of the machine between the two spindles is occupied by a work holding mechanism adapted to receive a workpiece for each pair of spindles. The work holder securely clamps the workpiece in a fixed position determined by a pilot part of the forming tool and is thus accurately located relative to the spindles. The work holder carries the workpiece along in fixed relation to the spindles to a discharge point where it is positively discharged from the work holder.

This means includes a device adapted to feed a single workpiece to the work holder each time an individual clamp approaches the loading point. Also included in the feed mechanism is a device to keep the flow of workpiece blanks constantly full and under pressure in order that the flow may be uninterrupted.

The following more specific description will be made with reference to the drawings and will pertain particularly to the machine as set up to thread nuts. It is not my purpose, however, so to limit my invention as it is clear that other work may be performed thereby.

With reference to the drawings throughout which like reference characters are used to designate like parts, I have used the character 10 to designate the base on which the machine is mounted. A main drive motor 12 is mounted at one end of the base and is connected to the machine by a suitable coupling 14. The supporting structure for the machine includes end standards 16 which comprise not only end supports for the machine but also housings for the gear drives and certain auxiliary equipment as will appear later. Auxiliary supports 18 for the center section are mounted on the base and are braced longitudinally of the machine by the bars 20. The supports 18 are merely legs carrying guide members 22 whose formation and function will be described hereinafter. When the machine is in operation, covers (not shown) may be provided supported in part by these tie bars. A front apron 24 is a part of this system of covers.

At the rear of the machine may be mounted an auxiliary housing for such equipment as cutting fluid filters and cleaners and the like. A commercial nut hopper mechanism 26 driven by a motor 28 is mounted on the housing. This hopper is of such size and speed that it will deliver nut blanks to a chute 30 at a rate faster than the machine can handle them. This insures that the feed mechanism is always full and ready to feed a new workpiece into the carrier as will be described.

Further means to assure this condition are embodied in a feed control mechanism 32 which may be mounted on a bracket supported from the housing. This mechanism is adapted to keep the stream of blanks in an outlet chute 34 therefrom continuously under pressure. The feed control mechanism 32 is specifically disclosed in my application for United States patent, Serial No. 723,891, filed March 25, 1958, now Patent No. 2,995,703, for Blank Feeding Device for Metal Working Machines; also a division of my aforesaid application for United States patent.

Electrical controls for the main drive motor 12 and the hopper motor 28 are mounted in small separate switch boxes 36 on the front of the machine. These contain the usual stop and start switches and signal lamps and are conventional in the art. Separate controls 38 for the feed control 32 are provided in one cover 40 of the device. This cover 40 as well as the cover 42 on the other side are held onto the device by knurled nuts 44 threaded onto studs in the feed control housing. A mechanical control operated from either the front or rear of the machine by handles 46 is also provided to engage or disengage the machine from driving engagement with its drive motor 12.

Driving Mechanism

Figure 2:
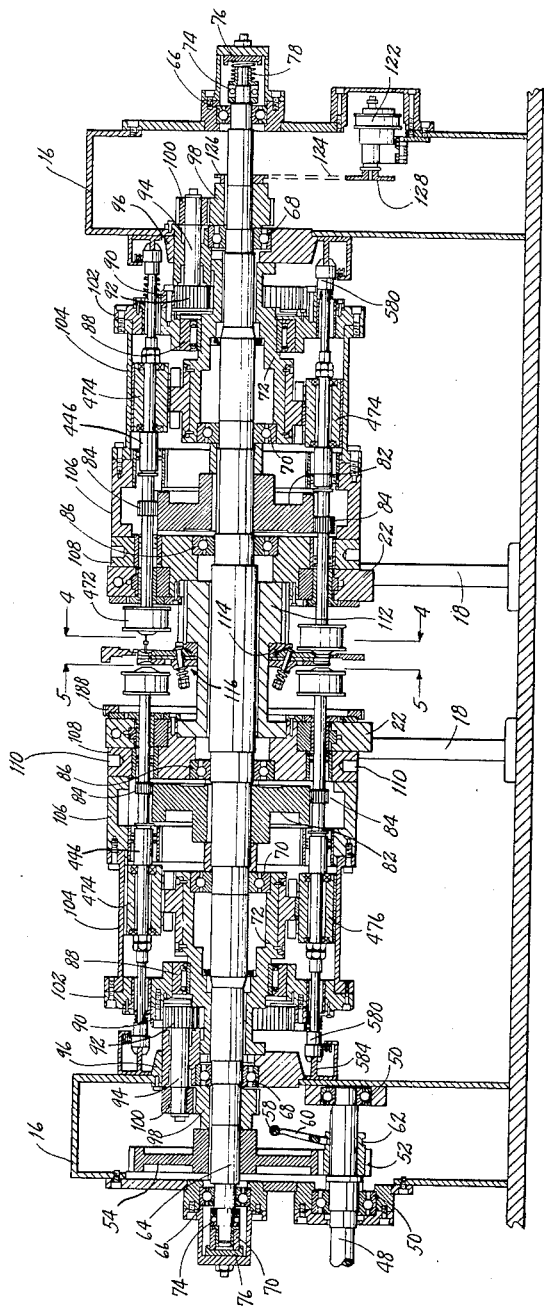
FIG. 2 is a longitudinal medial sectional view through the machine.

The main drive of the machine is from the motor 12, as noted above, through the coupling 14 to a shaft 48. As is best shown in FIG. 2, this shaft is journalled, preferably in ball bearings 50, in the left hand standard 16. A pinion 52 is mounted on the shaft 32 and is splined thereto. This pinion is adapted to be shifted into or out of engagement with a gear 54 by the lever 46 (FIG. 1) through a shifting mechanism. The shifting mechanism is a simple fork shifting arrangement actuated by the lever 46 which moves a shaft 58 to which is fixed a shifting fork 60. This fork engages a groove 62 in a collar on the pinion 52 in a manner well known in the art and thus is adapted to shift the pinion into and out of driving engagement with the gear 54.

The drive from the pinion is normally transmitted to the gear 54 and thence to a main drive shaft 64. The shaft 64 is journalled near its end in end bearings 66 in the outer walls of both standards 16 and also in near end bearings 68 in the inner walls. Still further support is provided approximately midway between the center of the shaft and at both ends by near center bearings 70 mounted in central stationary members 72. These latter members are bolted or otherwise suitably mounted on the inner walls of the standard 16 at both ends. Thus the shaft is supported by six bearings. Firm support such as this is necessary because the shaft is the sole support of nearly all of the operating mechanism of the machine. Furthermore, such support will help to prevent whipping of the long shaft. A thrust bearing 74 is provided at each end of the shaft. Adjustable cupped members 76 are fixed to the standards 16 and at the right end adjust the compressive force of a spring 78. A spacer 80 is substituted for the spring 78 at the left end of the shaft, but in other respects the devices on both ends are the same.

A pair of large "bull" or sun gears 82 are keyed to the shaft adjacent to and inboard of the near center bearings 77. These gears are the sun gears for two symmetrical planetary gear systems formed by planetary pinions 84 carried about the sun gears 82 by an irregular shaped drum supported partly on the shaft by center bearings 86 and partly on the stationary members 72 by roller bearings 88. This drum is driven from both ends through internal ring gears 90, driven by pinions 92. The pinions 92 in turn are keyed to similar countershafts 94 journalled in bearing brackets 96 mounted on the inner wall of the standard 16. These countershafts 94 are driven by the main shaft 64 through gears 98 keyed to the main shaft and meshing with gears 100 on the countershafts 94.

The main drum is substantially symmetrical end-for-end, except directly at its center. The ring gears 90 are mounted on end plates 102 which also support the roller bearings 88. These end plates 102 are connected to the rest of the drum by cover members 104 (FIG. 1) which may conveniently be bolted to the end plates 102 and to spindle supporting members 106. The spindle supporting members 106 are fastened to inner wall members 108 on both sides of the center section of the machine. Holes 110 may be provided in the end members 108 into which a bar may be inserted for turning the machine by hand if desired. The wall members 108 hold the center bearings 86 and so help to support the drum. A center hub 112 joins the wall members from both sides and completes the basic structure of the rotating drum. The hub 112 is the only part of the drum assembly which is not symmetrical, being formed with a shoulder 114 to which is fastened a face plate and clamping or work holding mechanism 116, as described hereinafter. A second spindle support member 118 (FIG. 3) may be bolted or otherwise fastened to the wall members 108 on each drum, and a cover plate 120 (FIG. 3) may be used to cover the complete end of the assembly. The cover 120 and spindle support 118 slide freely relative to the guide member 22 and are formed particularly for the purpose of providing proper lubrication and flushing of chips.

A small oil pump 122 (FIG. 2) may be mounted in one of the end supports 16 to provide lubrication for the gears and bearings in that support. The pump is driven by a chain 124 engaged with a sprocket 126 on the main shaft and driving a sprocket 128 on the pump shaft. A sump may be formed in the base of the support to catch the oil and supply it to the intake side of the pump 112.

Nut Injecting Mechanism

As the nut blanks leave the feed control device which is shown in my pending application for United States patent, Serial No. 723,891, filed March 25, 1958, for Blank Feeding Device for Metal Working Machines, they pass through the chute 34 into an injector device which positively injects one nut blank into each receptacle in the clamping device 116 as the turret passes. This injector device is mounted on an arcuate support 130 (FIG. 8) which also supports a device to carry away completed nuts and various other auxiliary equipment at the center part of the machine. As previously stated, the center supports 18, which are disposed in spaced longitudinal relation at the center of the machine, carry generally rectangular plates forming the guide member 22 as can best be seen in FIG. 2. These plates are also disposed in longitudinally spaced parallel relation. The upper edges of the members 22 have secured thereto in bridging relation a bar 132 which can be seen in FIGS. 4 and 5. The support 130 is carried on the frame at its upper and lower portions.

Figures 8, 9, 10:
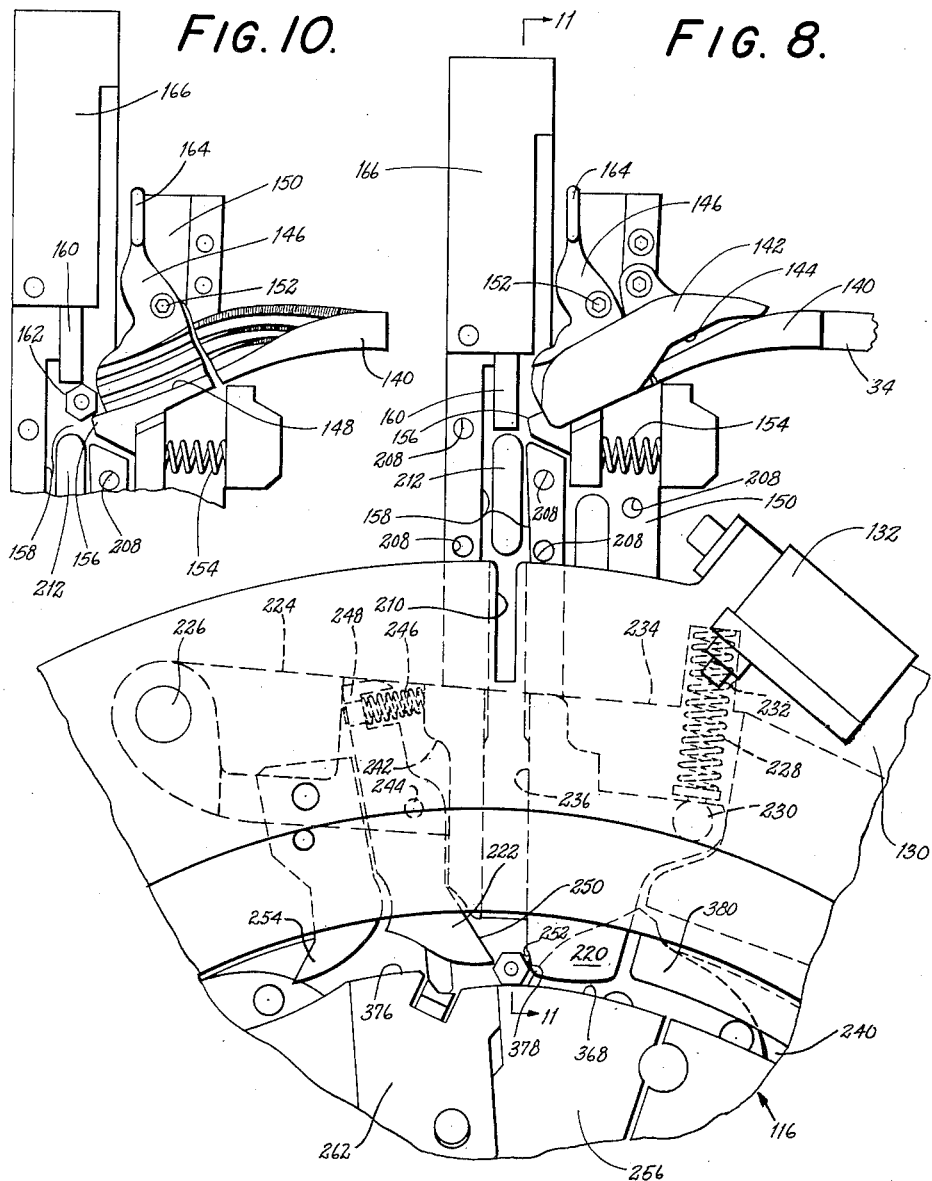
FIG. 8 is a detailed elevational view of the injector mechanism from the same side as FIG. 4 and rotated approximately 45 degrees to an upright position, some of the parts having been removed to show underlying parts.
FIG. 9 is an elevational view of a feeder piece forming part of the injector mechanism of FIG. 8, removed from its surroundings and drawn to a reduced scale.
FIG. 10 is a detailed view of the inlet of the injector with the cover removed.

The nut blanks are guided by the chute 34 to an inlet guide 140 which has a cover 142. As best shown in FIG. 10 where the cover 142 has been removed, the guide rotates the nut blank and sets it up on edge. An observation slot 144 may be left between the cover 142 and the inlet guide 140 if desired to watch the progress of the blanks. From this guide, the nut blank enters a movable entry member 146. This member is formed with a slot 148 for the nuts which is also covered by the cover 142. The cover 142 is pivoted to a supporting frame 150 of the injector by a screw 152. A spring 154 engaged between the cover 142 and the framework 150 biases the member 146 to the position shown. A lip 156 guides the blanks to their proper position over a slot 158. A ram 160 movable vertically (FIGS. 8 and 11) normally retracts, receives the nut, and forces it downward in the slot 158 formed in the injector. However, on rare occasions, it may catch a blank 162 as shown in FIG. 10. In case the blank is misaligned as it enters the injector, the member 146 pivots against the force of the spring 154 and prevents damage to the machine or to the blank. On the next successive stroke, the nut will almost invariably find its way into the slot 158 and pass through the machine. The motion of the member 146 may be utilized to operate a shut down switch (not shown) by forming a vane 164 on the member and mounting the switch in position to be operated thereby. This has been discovered to be an unnecessary precaution, but might be useful in some cases.

Figure 11:
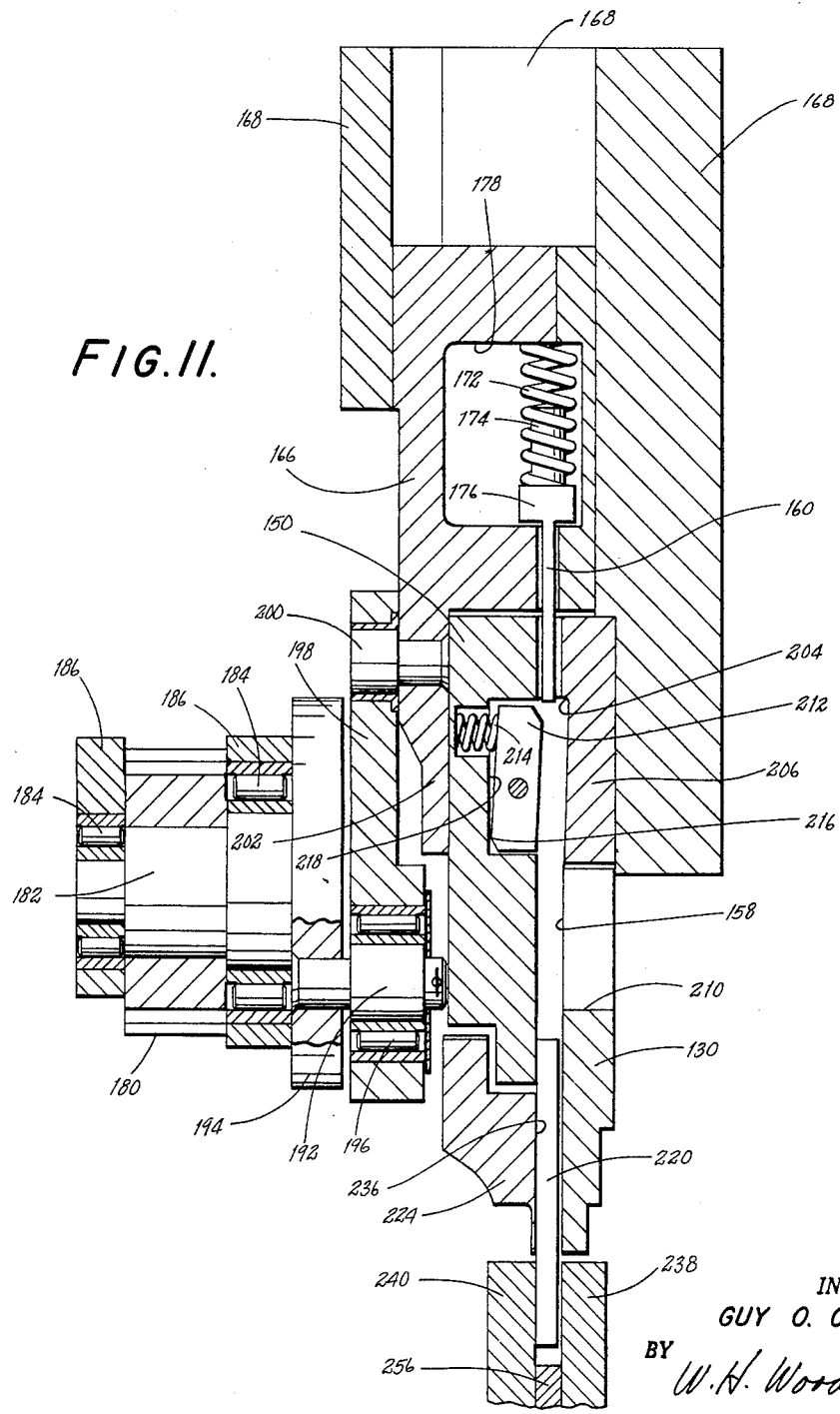
FIG. 11 is an enlarged sectional view through the injector mechanism taken on line 11—11 of FIG. 8.

The ram 160 is carried by a slide block 166 slidably guided by a guide 168 (FIGS. 5 and 11). The guide 168 may be bolted to the frame 150 by a bolt 170 as shown in FIG. 5 and be aligned by dowels or the like, not shown. The ram 160 is slidable in the block 166 and is urged downward by a compression spring 172 disposed over a stud 174 formed on the ram upwards of a collar 176. The spring 172 abuts the top wall 178 of an opening in the block 166. Because of the shape of the ram 160, it is desirable that the block 166 be formed of two pieces as shown (FIG. 11) in order to facilitate assembly as will be apparent to those skilled in the art.

The block 166 is reciprocated in timed relation to the rotation of the main drive members by a gear and crank mechanism best shown in FIGS. 5 and 11. A pinion 180 is keyed to a shaft 182 which is journalled in roller bearing 184 between two arms 186 of a yoke attached to the support member 156. This pinion is meshed with a ring gear 188 (FIGS. 2 and 3) fixed to the cover plate 120 of the spindle carrier. The gear ratio between the ring gear 188 and pinion 180 will depend on the number of spindles in the machine, the ratio being such that the pinion makes one full revolution during the passage of the space between two adjacent spindles. In the present embodiment, having eight spindles, the ratio is eight to one. An eccentric 192 is staked into a disk 194 formed on the end of the shaft 182. This pin extends from a face of the disk and is journalled in a roller bearing 196 mounted in a crank arm 198. The arm 198 is journalled at its other end on a pin 200 staked into a depending flange 202 of the block 166. Thus the ram 160 carried by the block 166 reciprocates through a complete up and down cycle each time a spindle passes. As noted, each time the ram is withdrawn upward, another blank is pushed into the slot 158 because of pressure on the stream of nuts above imposed by the feed control device of my concurrent application referred to above. At each down stroke of the ram, then, the string of nuts enclosed in the channel 158 will be moved down to inject the last nut into the clamping device 116.

In order to prevent the row of nuts in the slot 158 from following the ram 160 on its back or upward stroke, a shoulder 204 (FIG. 11) is formed in the cover 206 for the slot 158. This cover, which has been removed in FIG. 8 to show underlying parts, may conveniently be held by screws driven into tapped holes 208 in the framework 150. The cover may also extend over and cover the spring 154. An observation slot 210 is cut through the support 130 and opens into the slot 158 to observe the passage of the nuts if desired. A spring pressed pad 212 is pinned to the framework 150 in the wall of the slot 158 opposite the shoulder 204. A spring 214 disposed in a hole in the frame urges the pad to the position shown in FIG. 11. The movement of the pad is limited by the engagement of its lower edge 216 with the wall of a recess 218 in which the pad is disposed. However, the movement of the pad 212 is sufficient to push each successive nut blank under the shoulder 204 to prevent it from returning upward with the ram 160. In addition to holding the nut under the shoulder, the pad 212 by its motion breaks any bond between the blank and the ram which might be caused by oil or the like on the meeting surfaces. When the machine is in full operation, the slot 158 is completely full of blanks and, therefore, each new one which is pushed under the shoulder 204 by the ram 160 causes a blank to be injected into the machine.

Between injection strokes, the blank at the bottom of the slot 158 is held between two fingers 220 and 222 (FIG. 8). The finger 220 is formed as a part of a movable piece 224 pivoted to the support 130 at 226 (FIG. 8). The piece 224 is biased toward the center of the machine by a spring 228 having an end fitting 230 at one end seated in a socket in the piece 224, and the other end seated in a hole 232 formed in a flange 234 of the support member 130. A continuation 236 of the slot 158 is formed in this piece and is closed by the support 130 so that the channel for the nuts is substantially continuous. Motion of a blank along its axis as it passes out of the slot 236 toward the end of the fingers 220 and 222 is prevented by a spider plate 238 and a face plate 240 disposed on opposite sides of the fingers 220 and 222. These plates are a part of the face plate and clamping of work carrying mechanism 116 (FIG. 11).

The second finger 222 is movably disposed in a hollow 242 in the piece 224 and pivots about the pin 244 (FIG.

9). A compression spring 246 engages a wall of the hollow 242 and the outer end 248 of the finger 222 and thus biases the end of the finger 222 toward the opposite finger 220. At its lower end, the finger 222 is formed with a flat surface 250 slanting at an angle of approximately 60 degrees so as to engage the flat surface of the nut blanks as they come down the channel. In FIG. 8 the blank has been pushed beyond the end of the finger 222 and the face 250 is ready to engage the next succeeding nut blanks is eventually removed from the mechanism 116, as hereinafter described. Between injection strokes, the lowest nut blank is held between the fingers 220 and 222 as shown in FIG. 9. A slight dimple 252 may preferably be formed in the finger 220 to hold the nuts in place until action of the ram 160 forces them out of the channel. It will also be noted that the hollow or relieved part 242 extends beyond the finger 222 toward the pivot point to provide clearance for a hook 254 whose purpose will be made clear hereinafter.

*Work Carrying Mechanism*

Figure 15:
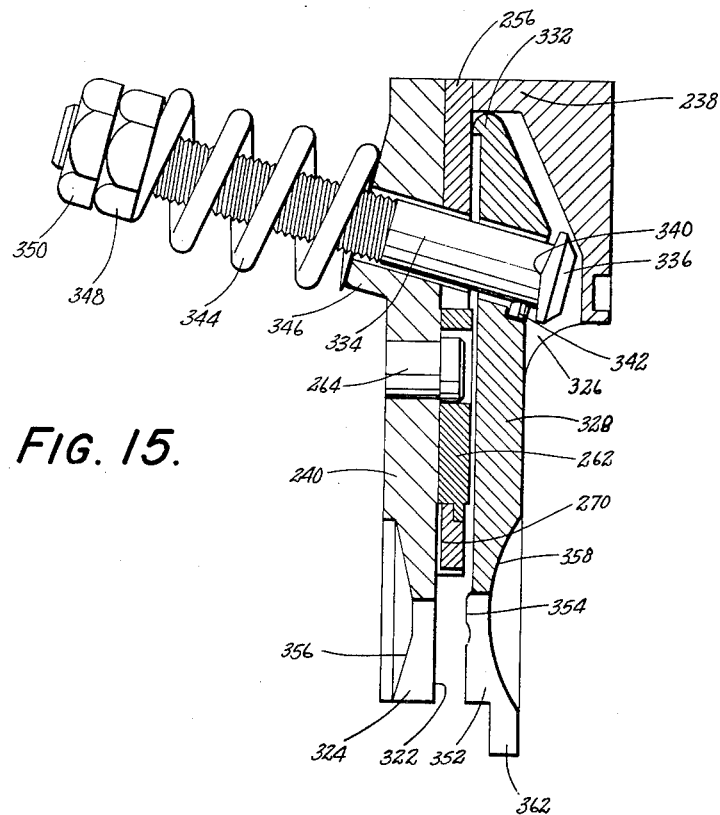
FIG. 15 is a radial sectional view through the centerline of the clamp mechanism.

The work carrying mechanism 116 as noted above is carried by the central hub member 112 and therefore rotates in unison with the spindle carrying drum. The primary structure of the mechanism 116 is formed of three plates: the spider plate 238, the face plate 240, and, between these two plates a carrier plate 256 (FIG. 13). Reference may be had to FIG. 15 which shows an enlarged section of this mechanism. These plates are each made in two segments so that they can be assembled on the hub member 112 and are fastened to the hub by cap screws 258 (FIG. 5). The plates thus are rotated in the direction of the arrow A (FIGS. 4, 5 and 12), by the hub member.

Most of the working mechanism of the work holder is carried between the face plate 240 and the spider 238. This mechanism is designed not only to prevent the nut from rotating while it is being threaded, but also to assure perfect alignment of the nut with the threading tool, both as to the hole in the blank and as to the centerline of the threads being normal to the face of the nut. The mechanism also provides positive means of ejection of the nut from the clamp and provisions to prevent jamming of the nuts at the high speeds at which the machine can be operated.

Figure 4:
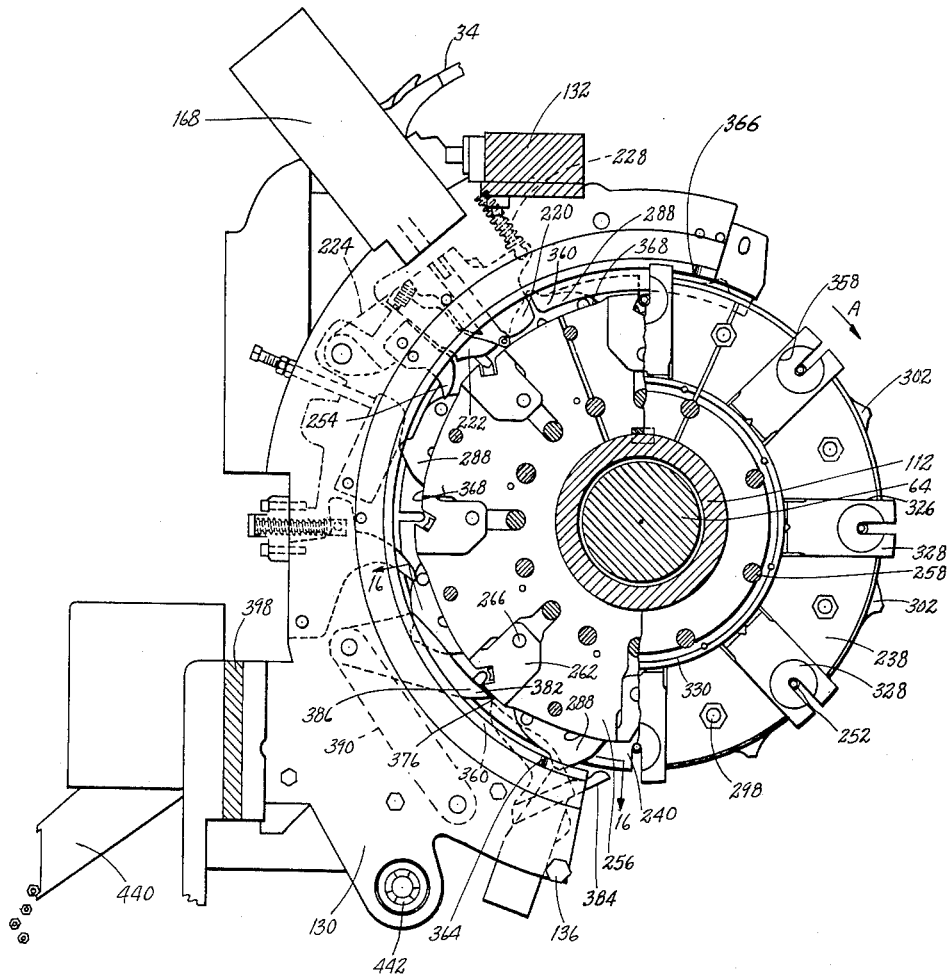
FIG. 4 is an enlarged sectional view taken along line 4—4 of FIG. 2.

The carrier plate 256 is formed to provide openings 260 in which are disposed the wrench members 262 (FIGS. 4 and 12). A pin 264 pressed into the face plate 240 (FIG. 14) has a head 266 extending into a slotted opening 268 in the wrench. Thus the wrench is free to move slightly in a radial direction. A pusher bar 270 is slidably disposed in a relief 272 in the wrench 262, and has an end 274 formed the full thickness of the wrench member adapted to move in a slot 276 in the wrench. This end 274 is formed to receive two adjacent sides of the nut so that the wrench actually will engage four sides of a hexagonal nut, for example.

The pusher 270 is adapted to be moved by a rack 278. This movement is transmitted by the engagement of a flange 280 on the pusher 270 in a slot 282 formed in the rack member (FIG. 13). The slot 282 is somewhat enlarged on the flange 280 to allow the pusher 270 to follow the wrench 262 in its slight radial movement previously mentioned, while the rack retains its position. The rack member itself is slidably disposed in a channel formed by matching reliefs 284 and 286 in the liner 256 and face plate 240, respectively (FIGS. 12 and 14). Movement of the rack is induced by a gear member 288 having teeth 290 partially around its periphery and meshed with the teeth 292 on the rack. This gear 288 is journalled on a brass bushing 294 surrounding a bolt 296 extending through the three plates and having a nut 298 on each end. The gear is disposed wholly within a relief 300 in the face plate 240 which is covered by the surface of the carrier plate. Thus the gear 288 is displaced slightly from the plane in which the pusher 270 operates, and in which the nut blanks are inserted into the wrench. The gear member 288 is moved by engagement of a follower portion 302 formed on its periphery with either of various cam members fixed to the support 130 and which will be described later. This movement is resisted by a spring 304 fitted with end members 306 engaging the face plate 240 and carrier plate 256 at one end and an ear 308 on the gear member at the other end. The spring is disposed in a channel formed by relief grooves 310 and 312 in the face plate and carrier plate respectively (FIG. 14). A pin 316a pressed into the face plate 240 and extending through an arcuate slot 316 in the gear member 288 forms a stop member to limit the motion of the gear. A second pin 318 extends upward from the gear member through a slot 320 in the face plate (FIG. 5) and beyond to provide follower means for a camming action to help the spring return the gear to its normal position as will later appear.

As noted above, the nut as it comes from the injector channel slides between the inner surfaces of the face plate 240 and spider 238. A surface 322 (FIG. 15) of the face plate is a smooth flat and continuous surface broken only by radial slots 324 just wide enough to clear the threading tool as it passes through the nut. The surface 322 is accurately formed so that when the work carrying assembly 116 is fixed to the drum member 112, the surface is normal to the center line of the machine within very small tolerances. This insures that one face of the nut will be normal to the center line of the tapping tool.

The spider plate 238 is formed with openings 326 (FIGS. 4 and 15) substantially radially of the plate in which are disposed clamp members 328. A hub 330 is formed at the center of the spider and the opening 326 is cut into but not through this hub. The clamp member 328 extends into the opening in the hub and at the inner end is formed with a fulcrum 332 adapted to press against the carrier plate 256. The clamp is pulled toward the face and carrier plates 240 and 256 by a bolt 334 extending through the clamp, carrier and face plate. This bolt has a special head 336 adapted to ease the rocking action of the clamp. The surface of the head engaging the clamp is formed with a V-shape so that only the apex 340 of the V engages the clamp. A small pin 342 carried by the bolt 334 and engaged in a slot in the clamp 328 prevents the bolt from becoming misaligned and therefore insures that the apex 340 is always in the proper line for the clamp to rock thereon. A spring 344 engaged between a hub 346 on the face of the plate and a nut 348 on the bolt 334 holds the clamp normally closed. A jam nut 350 may be used to prevent movement of the nut 348. The spring is preferably quite heavy and is prestressed to assure that the clamp will be held in its closed position at all times except when forcibly opened. A slot 352 similar to the slot 324 is formed in the free end of the clamp. However, instead of a smooth flat surface as on the face plate, it is preferred that a slight transverse ridge 354 be formed on the inner surface of the clamp by cutting a groove into the base of the clamp. This ridge engages the nut blank approximately at a centerline and assures that the blank will be lined up by the face plate which is a fixed surface instead of the clamp which moves and might be out of line because of the differences in the thickness of the blanks. The face plate 240 and clamp 328 both have hollows 356 and 358 respectively at the edge opposite the slots to provide clearance for the spindle heads later to be described.

In order to inject or eject a nut from the clamp, it is necessary that it be opened by external means. This may conveniently take the form of a cam ring 360 (FIG. 4) formed on the support 130. This ring extends along the inner side of a lip 362 on the clamp member 328 and is formed with a rise at 364 at its lower end (FIG. 4) which serves to spread the clamp member away from the face plate. The cam ring 360 is in reality only a continuation of the support 130 and is formed with varying thickness to operate the clamp. The rise 364 is located so that the nut may be ejected at the proper time, and the clamp 328 is held open by the ring 360 until it reaches a fall at 366 somewhat beyond the point where the nut is injected, for a reason to be made clear hereinafter.

During a cycle of rotation of the clamp and wrench mechanism a series of events takes place. As noted above, rotation of the plates is in the direction of the arrow A. As the nut is injected, it is pressed onto the outer edge surface 368 of the carrier plate (FIG. 12). It is held there in spring pressed engagement by the spring 172 on the ram of the injector through the train of nuts in the channel 158. As the plates move around, beneath the nut, an adjustable cam 370 (FIGS. 5 and 12) engages the follower part 302 of the gear member 288 and rotates the gear, pushing the pusher bar 270 up to a position where one surface of the end 274 is substantially in line with the outer edge 368 of the carrier plate and the corresponding surface of the wrench 262, as seen in FIG. 12. The cam 370 may be adjusted by a screw 372 which is locked by a jam nut 374, so that this alignment can be established and maintained. The nut then slides smoothly into the end of the pusher, while the finger 222 of the injector just clears an upper edge surface 376 of the wrench (FIGS. 8 and 12).

As soon as the blank is in the end of the pusher, the follower 302 is disengaged from the cam 370, and the spring 304 reverses the motion of the gear 288, thus retracting the pusher. The nut may then fall into the wrench. However, this is not a positive movement as may be necessary, and, therefore, the finger 220 is long enough to engage the nut and push it into the wrench. A rounded corner 378 on the finger aids this operation. A downwardly extending rib 380 on the support 130 and having an inner surface concentric with the carrier plate 256 extends close to the wrench 262 and opposes the tendency of the nut blanks to come out of the wrench because of the centrifugal force of the blank. As noted above, the finger 220 is a part of the movable piece 224 and is therefore adapted to slide upward on the side of the nut blank should it not recede quickly enough. However, the finger is purposely made broad in the direction of travel of the plates so that should the finger ride up in such manner, the pressure of the spring 228 on the piece 224 added to that of spring 304 on the gear will surely cause full retraction. As the finger 220 passes over the nut, the corner 378 strikes a rounded corner 382 formed on the wrench which cams the finger up over the surface 376. This impact is quite hard, and it is considered possible and perhaps even desirable, although not necessary, that a crank device operated from the ring gear 188 similar to the nut injector could be used to raise the finger 220 in timed relation to the passage of the wrench to avoid the impact.

As the nut is carried beyond the finger 220, it is fully retracted into the wrench. It will be recognized that the pusher mechanism may not be essential, and that a nut could be inserted into the wrench without such mechanism. In this case, the wrench would be formed with an opening similar to the shape of the present wrench with the pusher retracted. However, it has been found that there is considerable tendency for a nut blank pressed onto the surface 368 to roll into the wrench rather than to slide. When such rolling occurs, a few of the blanks are caught by the wrench across their corners instead of across thin flat faces. This jams the machine and, in view of the speed at which the machine may be operated, such jamming might very well result in breakage of parts. The movement of a flat surface in line with the edge 378 strongly deters such rolling so that all the nuts may be retracted properly into the wrench.

The clamp 328 is held open during the entire injection process as described, by the cam ring 360. It is held open even beyond the full retraction of the nut. During this next succeeding period, the threading tool is inserted through the slots 352 and 324 in the clamp and face plate respectively and through the central hole in the nut blank. The mechanism to accomplish this will be described hereinafter as will the formation of the tool which causes the insertion to line up the hole. Suffice it to say that, by the insertion of the tool into the hole in the blank, the nut, along with the wrench which is free for limited radial movement as noted above, may be moved slightly. As soon as the nut is aligned, however, the clamp 328 is allowed to close because of the fall 366 of the cam, and the blank is then clamped securely against the face plate 240 and held from rotation by the wrench 262. Just beyond this point the work holder member 116 carries the blank beyond the end of the rib 380.

During the next period of motion of approximately 180 degrees of the plates, the threading tool is driven through the blank by mechanism hereinafter described. However, as the blank reaches the bottom of the machine (FIGS. 4 and 5), the clamp 328 again engages the rise 364 of the cam 360 and is opened. At this point, the nut is free to fall out or be thrown out of the wrench by centrifugal force onto a discharge mechanism which removes the completed nuts. However, in order to get a positive discharge, a second jam 384 is mounted on the support 130 to move the pusher bar 270 outward from the center of the plates and force the nut out of the wrench. Since the exact final location of the pusher is not of great importance here, no adjustment is provided. In order to assure that no nuts are carried beyond this station, a stripper 386 in the plane of the wrench extends almost to the outer surface 376 thereof to strip off any nuts and also any metal chips which may be carried along in the process. The stripper 386 is mounted on a spacer 388 at one end of a long arm 390 pivotally mounted to the support member 130 at 392 (FIGS. 5 and 16). A spring 394 engaged between a boss 396 mounted on a plate 398 and a fitting 400 on the arm 390 urges the stripper to an inward position towards the center of the plates. Inward motion of the arm 390 may be prevented, however, by engagement of the spacer 388 with a plate 410 fixed to the support 130 but spaced therefrom by a boss 404 so that stripper may extend between the plate 410 and the support 130. It will be apparent that other stop means might be used to hold this stripper and arm and prevent their movement beyond certain limits. A rounded corner on the stripper allows it to ride up on the corner 382 of the wrench and effectively clear the edge surface 376.

As the wrench 262 passes the stripper 386, the cam 384 releases the follower 302 and the pusher is free to recede. However, at this station, there may be chips or the like interfering with free movement of the pusher and, therefore, a cam 406 is provided which lies just beyond the outer surface of the face plate 240. As noted above, pins 318 extend through arcuate slots 320 in the face plate far enough to be engaged by the cam 406. This engagement serves to return the gear 288 and also the rack 278 and pusher 270 to their normal retracted position (FIG. 5).

Further movement of the plates causes the follower part 302 to be carried under a lateral stripper bar 408 (FIGS. 6, 7 and 16). This bar is fulcrummed on a plate 410 at 412 and is slidable freely on a stud 414 on that plate. A spring 416 engaged between a nut 418 on the stud 414 and the bar 408 serves to press the bar always towards the plates. However, the follower part 302 engages a sloping surface 420 and pushes the bar outwards against the spring 416. Outward movement is limited by an overhanging lip 422 on a boss 424 on the plate 410. As soon as the follower part 302 is past, the bar 408 snaps back to its original position as shown in FIGS. 7 and 16, and in this position it keeps the edges of the plates adjacent the follower part 302 clear of chips and the like, and also will knock down any nuts which happen to be carried around past the stripper. It will be noted that an end 426 (FIGS. 5 and 16) lies adjacent this stripper. Actually, the end 426 may rest against the stripper member 386 until the extending part 302 of the gear passes it. The radial position of the end 426 is just beyond the edge of the face plate 240 but close enough thereto to prevent a nut from passing between the face plate and the end 426 of the bar 408.

As the wrench is carried around still further, it passes two clearing hooks. A first hook 426 (FIG. 5) is pivoted to the support 130 at 428 and is urged toward the plates by a spring 430. The spring 430 is fastened to the hook 426 and the support 130 by suitable end fastenings in any preferred manner well known in the art. A second hook 432 (FIGS. 4, 5 and 12) may be riveted to the support 130. The pivoted hook 426 is spring loaded merely as a precautionary measure, and it might also be riveted to the support with little or no likelihood of damage ever occuring to the machine according to observations. Thus, these hooks extend adjacent the wrenches 262 and serve to catch dirt, chips and the like as the plates rotate.

I have described only one wrench assembly. This assembly is duplicated around the plate eight times at equal spacing in the embodiment shown. More or fewer assemblies also could be used depending on the size of the machine and of the individual wrenches. However, in case more or fewer were used, the gear ratio between the ring gear and injector pinion would have to be changed and timed accordingly.

As the nuts are pushed out of the wrenches 262, they fall on a chain 434 (FIGS. 5 and 16) engaged over sprockets 436 and drums 438 in any desired manner to deliver the nuts to an outlet chute 440. The chain may be driven by the lowermost sprocket 436 which in turn is driven through a coupling 442 (FIG. 4) by a shaft extending from the power source at the left hand end of the machine.

*Spindles*

Figure 3:
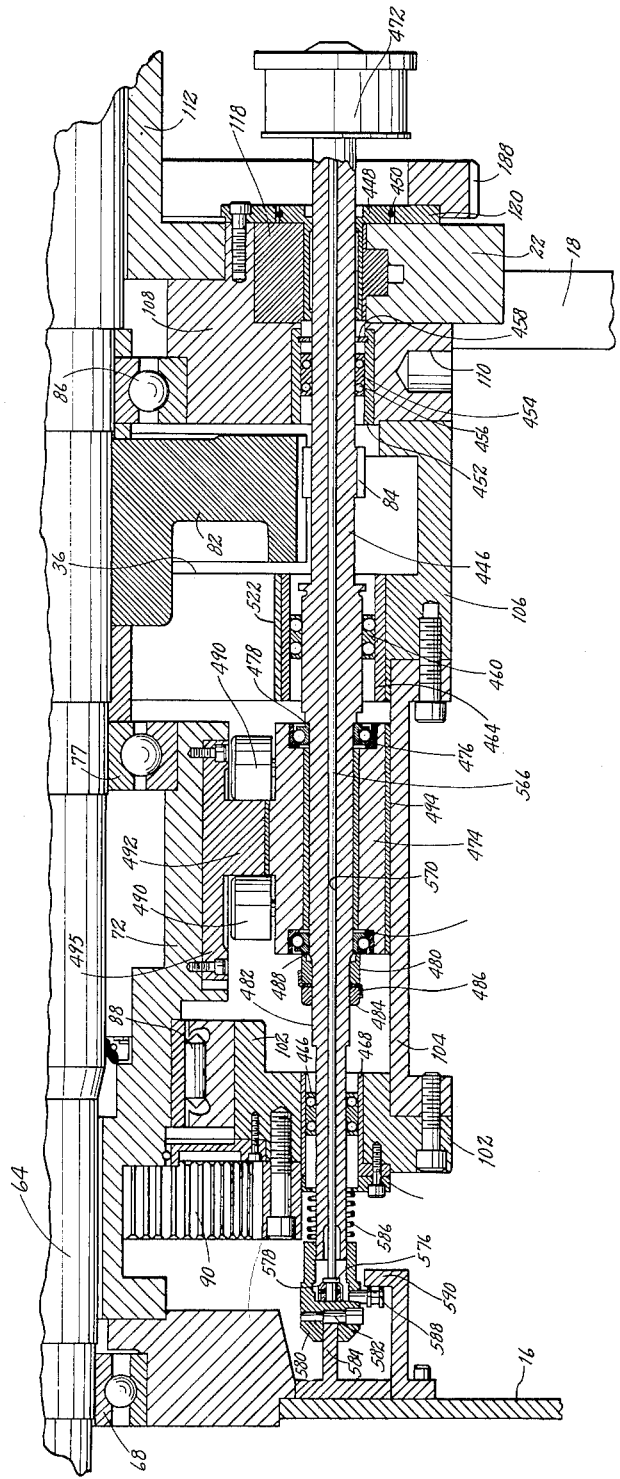
FIG. 3 is an enlarged sectional view of the spindle drive mechanism.

As noted above, the eight spindles on each side of the present embodiment are driven by the meshing engagement of the bull gears 82 with the pinions 84 on the spindles (FIGS. 2 and 3). Each of the spindles is adapted for longitudinal as well as rotary motion, thus being adapted to carry driving heads which drive a tool in a rotary motion while feeding it through a nut blank, and then following discharge of the finished nut, the heads carried by the spindles return the tool to its original position. It will be apparent that, while the shaft 64 is rotating in one direction, the spindle carrying drum device will be driven in the opposite direction because of the internal gear drive at the ends of the drum. Thus, the pinions 84 are carried around the bull gears 82 in a planetary manner and consequently are driven at a comparatively high speed. The pinions 84 may be formed as a part of the spindle 446 itself or may be suitably fixed thereto. It will be apparent that the direction of rotation of any or all of the spindles could be reversed by use of an idler gear between the pinion 84 and the bull gear 82. This might be useful in an operation where it was desired that the spindle on one side rotate in a direction opposite to that of the spindles on the other side. As best shown in FIG. 3, the spindle 446 extends through four of the individual members of the rotating drum. At its right hand end in that figure, the spindle is journalled in a bronze bearing bushing 448 pressed into the support member 118. Suitable packing 450 is provided between the cover 120 and the flange of the bushing to keep dirt and chips isolated from the bearings within the drum member, and to keep cutting fluid and the like within the bushing as will appear hereinafter.

The spindle 446 next passes through the end wall member 108. At this point, a hardened steel bushing 452 is pressed into the member. The surface of the spindle adjacent this bushing is also hardened. A form of ball bearing which will journal the shaft both for rotational and longitudinal motion is provided in the space between the bushing and the spindle. This bearing is formed by a sleeve 454 made of brass or similar material and into which two or more circumferential rows of balls 456 are staked in holes formed therein. This assembly of balls and retainer is placed between the bushing 452 and the spindle shaft in that region which then act as races for the ball bearing. It is evident that, in addition to the rotary motion of a regular ball bearing, the spindle can move longitudinally, rolling the balls 456 on the bushing 452 and causing the retainer and ball assembly to move longitudinally one-half the distance moved by the spindle. The bearing is formed so that the balls are preloaded. That is, the diameter of the balls are slightly greater than the space allowed for them between the bushing 452 and the spindle 446. This preload is preferably of the order of .0003 to .0005 inch. A snap ring 458 may be provided for this bearing and may also be used for the others to hold standard oil seal rings in place if desired.

The second and third spindle bearings are similarly formed and preloaded. A second bearing 460 is located in an inwardly extending, wide flange 462 formed in the spindle support member 106. This bearing also includes a hardened bushing 464 pressed into an opening in the flange 462 as a race for the bearing. A third bearing 466 includes a bushing 468 pressed into the end plate 102 and on which the bearing may roll. A cover plate 470 may be provided at this end to protect the bearings and retain grease.

At its end nearest the center of the machine, each spindle carries a tool holding head 472 which will be described in more detail hereinafter. The pinion 84 is located between the first and second bearings 454 and 460, and a follower block 474 which controls the longitudinal movement of the spindle is located between the second and third bearings. The spindles are journalled in the follower blocks by two commercial angular contact ball bearings 476, one at each end of the block. A fixed position of the spindle relative to the block is maintained by engagement of one of the bearings with a shoulder 478 on the spindle against which the bearing is held by the pressure of a nut 480 against theother bearing. This nut is threaded on a threaded part 482 of the spindle shaft and is retained by a jam nut 484. A flanged washer 486 having portions bent over the flats of the nuts to prevent relative rotation therebetween is located between the nuts 480 and 484. The nut 480 may be partially bored out as shown (FIG. 3) to clear a shoulder 488 on the spindle.

The follower blocks 474 have a pair of rollers 490 spaced apart just far enough to straddle a cam ridge 492 formed on cam segment blocks 495 which are held in the stationary part 72 of the support for the machine. Thus, while the rollers straddle the cam ridge 492, of this drum cam, they will translate any change in the location of that ridge into longitudinal motion of the spindle. However, since the follower block is free to rotate on the spindle, it is necessary to have some means for holding it in a fixed position with the rollers engaging the ridge. This is accomplished by the engagement of the outer surface of a brass sheet 494 with the inner surface of the cover member 104 which are finished as a bearing surface for the follower blocks to slide on longitudinally. Because of their wide arcuate outer surface, the blocks are then restrained from turning about the spindles. Both the spindles 446 and the cover member 104 rotate about the center of the machine at the same speed. Therefore, the only motion between the cover 104 and the follower block is the longitudinal sliding induced by the cam.

Movement of the spindles 446 by the drum cam is effective to carry the heads 472 toward and away from each other and thereby to drive a tool 496 through the blank and to pass it from one head to another. This movement may be modified to break chips formed by the tool in cutting material from the blank which may be desirable with certain classes of material, particularly when larger sizes of nuts are being threaded so that the chips will be of greater length which may cause jamming of the mechanism. This result is accomplished simply by offsetting certain of the cam segments 494 from the true line which the head would normally follow. This can be readily accomplished by grinding the cam to the desired feed with the segments 492 in a given relative position and then physically moving some of the segments in a direction which would cause a slight backing off of the tool cutting edge from the surface being cut, the overall result being an oscillation of the tool as the threads are cut. This motion is particularly desirable during the initial or roughing cuts, and the segments may be selectively offset to provide a chip-breaking action primarily during that period of motion of the tool. The amount of the offset may be of the order of the depth of cut being taken by the tool or somewhat less. Thus at the offset segments, if desired, the cutting edge may be almost completely backed off, thus breaking the chips. For most operations, this offset of the segments will be only a few thousandths of an inch and will readily be accommodated by the mounting of the segments. The reason such small offsets are effective to produce the desired result is formed in the roller type followers which fit snugly over the cam ridge 492 with substantially no clearance. This may be accomplished by preloading the followers. Therefore, any small variation in the cam is immediately transmitted from the follower through the spindle to the tool.

Precautions must be taken that the number of segments and the gear ratio of the spindle drive are not such that the tool is backed off each rotation at the same rotative position of the tool. It will be apparent that, if the tool is rotated an even fraction of a turn while the follower is traversing one segment, and with similarly offset segments, the cut will be a wavy line. However, if the tool is rotated something other than an even fraction, the initial cut will be wavy, but following cutting edges will smooth out the waves, because they will be retracted at other points in the cut. Thus the final result is uniformly smooth cut and is free from tearing because of jammed chips, and also without waves because of the proper proportions of the machine.

In some cases it might be desirable, however, to cut a wavy line such as in the case of a product whose finished threads are of a high finish, for example. In such cases it would be possible, with this type of cam construction, to offset certain sized cam segments to produce an action where the tool would cut first on one side of a thread and then the other to produce a wavy line. This wave could then be eliminated by a steady feeding final cut which would just shave off a very fine cut from the threads. This construction would require a longer tool with thread cutting edges ground for the particular cuts to be taken. The final cut being very thin could leave a fine finish on the threads as desired. Variations of these arrangements will readily occur to those skilled in the art.

Figure 17:
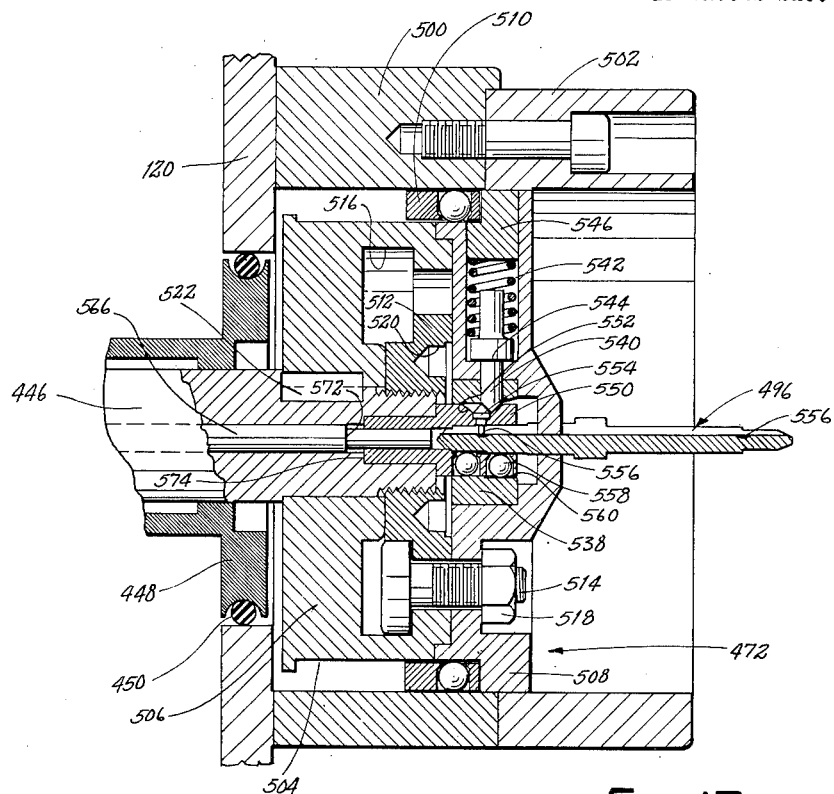
FIG. 17 is a sectional view on the vertical centerline of a tool holding head.
Figure 18:
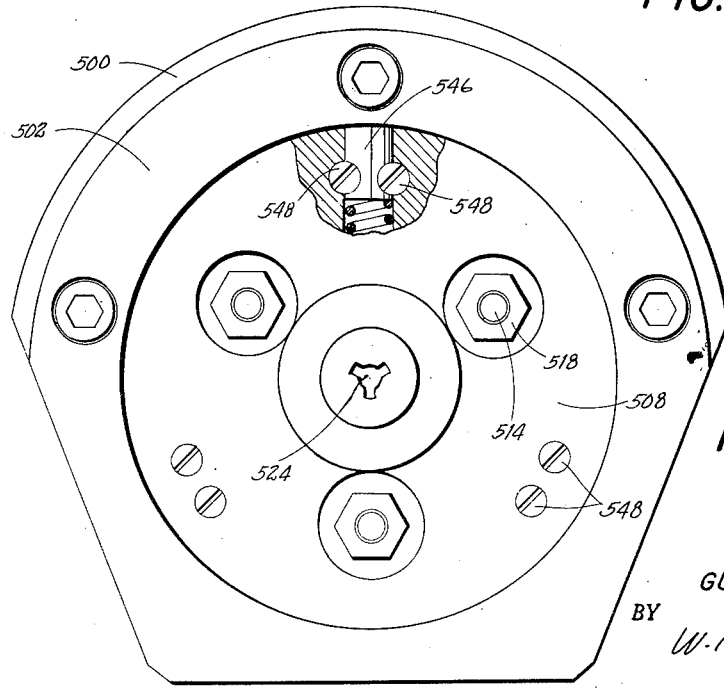
FIG. 18 is an end elevational view of the head mounted as in FIG. 17.

In FIGS. 17 and 18, the head is enclosed in a housing formed of two similar pieces 500 and 502 bolted together and fixed to the cover plate 120. These pieces are formed with an accurately machined and hardened inner cylindrical surface. The outer surface 504 of a base 506 of the head and of a portion of a front plate 508 are also hardened and ground. A bearing assembly 510 similar to those provided for the spindle in both formation and function is inserted in preload condition between the head and the housing to provide additional support for the head.

The head is formed of three principal pieces: the base 506, a retaining nut 512 and the front plate 508. These parts are held together by square headed bolts 514 engaged in an annular T-slot 516, formed by the base and retaining nut. The bolts 514 extend through spaced holes in the front plate and are fastened by nuts 518. The retaining nut 512 is screwed onto the end of the spindle and is formed with holes 520 to receive a spanner wrench. A key 522 engaged between the spindle and the base member 506 prevents relative rotation therebetween. The front plate 508 is formed with a central opening 524 shaped to fit the tool 496 which it is to carry (FIG. 18).

Figure 19:
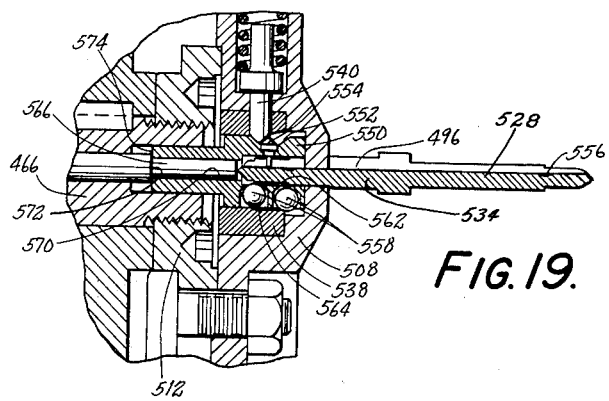
FIG. 19 is a fragmentary view similar to FIG. 17 showing the tool shank in a partly retracted position.

The tool 496 is formed with two shanks 526 and 528 on the ends of a thread cutting portion 530. This thread cutting portion may be formed as any thread cutting tap. The shanks also may be symmetrical but preferably are formed as shown in the drawings. The tool is initially supported by the right hand shank, while it is inserted through the nut, is then gripped by the other head on the left hand shank. Both shanks are held during the cutting operation, after which the tool is carried solely by the left hand shank and is withdrawn completely from the nut which is then discharged, after which the tool is passed back so that the right hand shank is picked up and held as initially, the left hand shank being released. At the ends 530, the shanks are pointed to assure easy entry into the head. The left hand shank 526 is formed in three different diameters; the first two being useful in holding and releasing the tool easily from the head as will appear later. The largest, 534 (FIG. 19), of the three diameters acts as a pilot diameter to center the nut blank as the tool is inserted into the hole in the center of the blank. This operation of the machine will also be described in greater detail hereinafter. Since there is no need for a pilot on the right hand shank 528 where the nut is discharged, this shank is formed with only the two diameters. In cross section the tool is formed with three equally spaced grooves 536 leaving three lands which are substantially complementary to the opening 524 (FIG. 18) in the front plate of the head. It will be obvious that more grooves and lands could be used, but three is the preferred number, since, then, the tool is sure to be driven at all three points.

The head is formed with novel holding means for the tool which provides for easy insertion and ejection of the tool while, at the same time, assuring positive driving and removing any play from the grip. The driving is accomplished primarily by the engagement of the shank 526 or 528 with the opening 524 in the head. The other characteristics are obtained from a loaded bearing arrangement formed in the head by the following described means. A hardened bushing 538 is pressed into the front plate 508 at its center. At three equally spaced radii, pins 540 extend through openings in this bushing and the front plate. Each of these pins is pressed toward the center by a spring 542 engaged between a shouldered seat 544 and a plug 546. The spring, seat and plug are disposed in three equally spaced radial holes in the front plate. As best shown in FIG. 18, the plug 546 is held in the head by two screws 548 extending into the front plate and engaging notches on both sides of the plug.

A retainer bushing 550, slidably disposed in an opening in the center of the bushing 538, is provided with three elongated dimples 552 equally spaced about its periphery. Centrally disposed in the dimple is provided a pin 554 having a near conical or chisel-pointed head to match the point of the pin 540. The pin 554 extends through and is slidably in a hole in the bushing 550. Thus the pointed pins 540 act as detent pins on the bushing in two positions, one on each side of the pin 554. In addition to acting as a detent, the pins 540 hold the bushing and prevent it from rotating out of line with the tool and also transmit some of the force of the spring 542 to the headed pin 554 urging it also in an inward direction against the shank 526 or 528 of the tool 496. A dimple 556 formed in the shank 526 at the proper location provides surfaces engaged by the pin 554 which acts as a detent and holds the tool in place in the head.

In each angular space between the pins 540, the bushing 550 is formed as a bearing retainer containing two balls 558. The diameter of these balls is greater than the thickness of the bushing, thus allowing them to roll. When the tool 496 is in its inserted position (FIG. 17), the balls are engaged in a loaded state between the lands of the shank of the tool, and the inner surface of an opening 560 in the bushing 550. Thus the tool is supported at two longitudinal points at each of three circumferential locations. This support is very secure being obtained by the deformation of a steel ball of approximately .0005 inch on the diameter, although this amount may be varied according to the size of the tool used. These balls could also press into the grooves or flutes. This is particularly true where three or two flutes are used. In such a case, the flutes could be stepped in a manner similar to the lands in the preferred embodiment.

It will be noted that both the surface of the opening 560 and the lands of the shanks 526 and 528 are stepped, and that these steps are equal so that the balls may be of the same diameter and be equally loaded. As the tool is ejected, the balls are rolled on the bushing 538 by the movement of the tool, thus causing the retainer 550 to move outwardly also. However, the tool does not have to roll out of engagement with both balls in the row. If that were required, movement of the tool and of the retainer 550 would be more than could easily be accommodated. Therefore, the stepped construction is used. After the tool has rolled a short distance, the balls 558 nearest the outer face of the head roll off a step 562 on the shank of the tool. At the same time, the other balls are rolling off a step 564 on the inner surface of the bushing 550. The magnitude of the steps is such that the tool is then released and is free to pass out of the head. At this point, the retainer bushing 550 has rolled to the position where the spring pressed pin 540 has passed over the head of the pin 554 and is thus in position to locate the bushing at its outer position. It will be recognized that by using different sized balls on the two (or more) longitudinal positions, only one of the pressure surfaces need be stepped to accomplish the desired result.

The tool is pushed out of the head by a rod 566 extending through a central opening 568 in the spindle. The retainer bushing has a hole 570 extending through it to receive the rod which can therefore engage the end of the tool to push it. The rod 566 is formed with a shoulder 572 adapted to engage the rear face 574 of the retainer to assure that it is moved to its outer position in place to receive the tool when it is again picked up by the head.

Movement of the rod 566 is induced by a cam and follower arrangement at the opposite end of the spindle from the head (FIG. 3). At this end, a collar 576 is formed on the rod to engage a small ball thrust bearing 578 held in a follower member 580. The follower member is freely journalled on the end of the spindle 446, so that it is carried by the spindle, but leaves the spindle free to rotate while the follower may be sliding longitudinally of the spindle. A roller 582 journalled in the member 580 engages a cam track 584 which extends into a slotted opening in the member 580. A spring 586 engaging the member 580 and the cover 470 urges the member 580 against the cam track 584, but in order to assure positive following by the follower, a radially extending roller 588 may be used engaging the surface of a second cam track 590. The tracks 584 and 590 may preferably be separate for ease of assembly. The cam tracks 584 and 590 are provided with matched surfaces since they operate on the same follower.

*Operation*

In its operation, as explained heretofore, the machine in its preferred embodiment is driven with two motions. The shaft 64 carrying the bull gears 82 rotates in a direction such that the top of the gears are approaching the observer in all figures. The drum carrying the spindles and work holding device rotates in the opposite direction.

Let it be assumed that the nut blank has just been injected into the work holder mechanism 116. The clamp 328 is held open by the cam formed on the support 130 and the tool 496 is firmly held in the right hand head 472 which is substantially fully retracted by the cam on the segments 494. The right hand central rod 566 is also retracted as its follower 580 follows the right hand cam fully to the right. This position may be considered as being at 330 degrees in the operating cycle. It will be noted that the left hand head 472 is located just slightly to the left of its completely extended position.

As the spindle moves from the first station to the second station, the left hand head moves slightly to pick up the tool. At the same time, the right hand head moves quite rapidly to the left causing the tool to enter the hole in the nut blank. During this motion, the hole in the blank is centered on the pilot part 534 of the tool 496. This is made possible because the clamp 328 is held open for a sufficient length of time and because the wrench member 262 is allowed a sufficient degree of movement as hereinbefore described. As soon as the blank is centered, however, the clamp member 328 is released and clamps the nut blank securely against the face plate. The blank is, therefore, properly centered on the tool and is firmly held in position so that the cenetrline of the threads will be perpendicular to that face of the blank which is against the face plate. This is the condition of the parts at approximately 15 degrees in the cycle. It will be noted that the cams 584 follow almost exactly the spindle cams 494 between these stations; the only visible deviation being at about 330 degrees where the left hand head moves forward without the rod 566 following. This, however, is wholly unimportant, for the tool it not held in this head, and the retainer bushing (FIG. 17) has already been positioned as will appear later.

The actual cutting takes place between the second and fourth portions of the cycle. In the second portion of the cycle, the left hand head has already engaged the shank of the tool and is driving it on the flutes, although in this embodiment the tool is so short that it has not been firmly seated in the head. The tool is made short so that it will not break as easily because of a long extension and so that it will be more rigid. It will be recognized, however, that with larger tools it would be feasible and might be desirable to seat the tool securely in both heads before starting the thread cutting operation. As the spindles progress, the right head is fed to the left, forcing the tool through the blank. This motion appears between about 30 degrees to just before 150 degrees of the cycle. This is actually the working time of the tool. The cams are designed to feed the tool at the proper pitch for the desired thread, and this is one principal reason for the desirability of easy interchange of cam segments particularly in view of the different pitch thread systems for a single diameter screw now commonly in use.

During the feeding, the left hand head is substantially dwelling at its most extended position. The tool is continuously fed into the head, reversing the rolling of the balls 558 (FIG. 17) previously described, and seating the tool firmly in the left hand head. If the rod 566 is not properly retracted to the left at the time, the tool will slide it back against the thrust bearing 578 (FIG. 3). Also during this movement, the retainer bushing 550 is moved back to its position shown in FIG. 14 by the rolling action of the balls.

At the fourth sector of the cycle, which corresponds to a point near 180 degrees, the tool is pushed out of the right hand head by the rod 566 which, in turn, is actuated by the slight rise in the cam present between 150 and 180 degrees of the cycle. This rise in the cam is effective to force the tool from the grip of the right hand head and to seat it firmly in the left hand head. At the same time, the retainer bushing 550 in the right hand head is positioned by the shoulder 572 on the rod 566.

At this point, too, the left hand head begins to recede from the work holder plates 116 and to carry the tool back with it. As the spindles progress to the fifth segment of the cycle, the tool 496 is completely withdrawn from the now completed nut. The clamp also is engaged by the cam on the support 130 again and is opened, and the nut is discharged by the pusher bar 270 into the outlet chute as hereinbefore described.

The next three segments of the cycle are provided for the transfer of the tool from the left hand head to the right hand head. This is accomplished while the clamp is held open and there is nothing held therein. This motion is similar to the passing of the tool in the other direction except that there is no feeding cycle, and therefore the exchange can be made more quickly. The exchange, in fact, is accomplished while the spindles pass from about 210 to just past 270 degrees in the cycle. In this space, the right hand head is substantially at a dwell in its furthest extended position. The left hand head quickly approaches it until the tool is completely inserted into the right hand head. As that head begins to pull away at approximately 270 degrees, the left hand cam 584 continues to push its rod 566 outward until the spindle reaches about 285 degrees, thus dislodging the tool from the left hand head and setting the retainer bushing.

As the spindles pass beyond this point, the right hand head is fully retracted whereupon the next nut blank is injected and the cycle starts again.

From the foregoing description, it can be seen that the spindle cam 492 and the push rod cam 534 could be substantially parallel for all except a very small part of the travel of the spindles. Since this is true, it is obvious that the push rod 566 could be carried with spindles throughout most of their travel, and only short wedge-shaped cams used where necessary to push the tool out of the respective heads. If such cams were to be used, the follower could be merely the end of the push rod which could slide on the cam for a short distance, or the follower could be formed by a ball retained on the end of the rod.

During the movement of the spindles longitudinally, they are also rotated because of the meshing of the pinions 84 with the gear 82. Since the spindles on one side are driven in unison with those on the opposite side, they are always in position to pass and receive the tool, and both are effective to drive the tool during the threading operation. The preloaded bearings 454, 460 and 466 (and also the bearing 510 if the housings 500, 502 of FIGS. 17 and 18 is used) are capable of both rotary and longitudinal motion, thus insuring a complete lack of "play" or "whip" in the spindles. Thus the spindle is always true, and since the nut blank is true, and both tool and blank are securely held, the threads will be cut to much closer tolerances than with prior machines using the conventional type "hook tap."

It will be recognized that the number of spindles in a machine built according to my invention is not fixed, but that more or fewer could be used. If more spindles were used and the machine driven at the same rotational speed, the output would be proportionately greater. Thus, it is possible with a multi-spindle machine to produce as many as 2500 nuts per minute as compared with present day production with conventional machines of from 50–100 nuts per minute. Moreover, the tool is no more expensive and perhaps less expensive than present day hook taps and, if made of suitable material, will last several times as long measured by the number of nuts produced per tap. This is true because of the complete lack of undesired relative motion between the tap and the nut blank, and because the use of fine fast cutting materials is feasible only with such a small tool. Thus my invention makes possible not only a greater production, but the upkeep cost, so far as tools go, is considerably less.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a production machine having a rotating drum for carrying spindles; workpiece manipulating means comprising a face plate, a carrier plate and a spider plate fastened together and held to said drum, said carrier plate being sandwiched between said spider and said face plate, a plurality of wrench members disposed in openings formed in said carrier plate, said members being formed to provide an opening for reception of a workpiece, a pusher member for each wrench member slidably disposed in a groove formed in said wrench members and said carrier and face plates, one end of each of said pusher members being disposed in the opening in each wrench member, operating means for pusher members disposed in relieved areas in said face plate being thereby displaced axially from said wrench members, a pair of each operating means extending radially beyond said plates, a stationary support member mounted in said machine adjacent said plates, workpiece injector means mounted on said support member in the plane of said wrench members adapted to inject workpieces into said wrench members, a clamping member disposed in openings formed in said spider plate adjacent each wrench member adapted to clamp said workpieces in said wrench members, cam means on said support member in the plane of said operating means adapted to engage the radially extending part thereof to cause said pusher member to eject a workpiece from said wrench member, said injector means being spaced angularly from said cam means on said support member, and second cam means on said support member in the plane of said clamping members formed to cause said clamping members to release their clamping action as each wrench member approaches said first named cam and said injector means, and stripper means on said support member in the plane of said wrench members adapted to keep said wrench members clear of chips and the like.

2. In a production machine having a rotating drum for carrying spindles; workpiece manipulating means comprising a face plate, a carrier plate and a spider plate fastened together and held to said drum, said carrier plate being sandwiched between said spider and said face plate, a plurality of wrench members disposed in openings formed in said carrier plate, said members being formed to provide an opening for reception of a workpiece, a pusher member for each wrench member slidably disposed in a groove formed in said wrench members and said carrier and face plates, one end of each of said pusher members being disposed in the opening in each wrench member, operating means for said pusher members disposed in relieved areas in said face plate being thereby displaced axially from said wrench members, a part of each operating means extending radially beyond said plates, a stationary support member mounted in said machine adjacent said plates, workpiece injector means mounted on said support member in the plane of said wrench members adapted to inject workpieces into said wrench members, a clamping member disposed in openings formed in said spider plate adjacent each wrench member adapted to clamp said workpieces in said wrench members, cam means on said support member in the plane of said operating means adapted to engage the radially extending part thereof to cause said pusher member to eject a workpiece from said wrench member, said injector means being spaced angularly from said cam means on said support member, and second cam means on said support member in the plane of said clamping members formed to cause said clamping members to release their clamping action as each wrench member approaches said first named cam and said injector means.

3. In a machine having a movable work holder adapted to carry work blanks and a driving means for said work holder, means for injecting work blanks singly into said work holder, including a body formed to provide a channel extending therethrough and discharging into a region passed through by said work holder, inlet chute means formed with a passageway discharging into said channel, plunger means slidably journalled in said body, a ram slidably disposed in said plunger means and extending into said channel, a spring engaged between said plunger means and said ram whereby said ram is normally projected into said channel, said ram being adapted to engage each blank as it is discharged from said chute and press it into said channel forming a stream of blanks in said channel, said spring being effective to maintain said ram in contact with said stream of blanks in said channel and to press said stream of blanks into engagement with said work holder as said plunger means is moved forward, and plunger operating means in operative engagement with said driving means to move said plunger forward in timed relation to the passage of said work holder.

4. In a machine having a movable work holder member formed with an outer sliding edge surface; and displaced therefrom in the direction of motion, an outer camming surface; said work holder being adapted to carry work blanks in an opening formed therein dividing said sliding surface from said camming surface, and driving means for said work holder; means for injecting work blanks into said work holder comprising a body mounted on said machine formed to provide a channel for the passage of said blanks, an inlet member pivotally mounted on said body and formed to provide a passageway for said blanks into said channel, a spring engaged between said inlet member and said body to bias said member to a normal position, a plunger means slidably journalled in said body, a ram slidably disposed in said plunger and extending into said channel, a spring engaged between said plunger means and said ram to bias said ram to a normal position in said plunger, operating means for said plunger operably connected between said plunger and said driving means for the work holder, to operate said plunger in timed relation to the passage of said work holder, said plunger being effective to reciprocate said ram between a retracted position where a blank may enter said channel from said passageway to a forward position where said ram is pressing said blank into said channel, said inlet member being adapted to be rocked by said ram if a blank becomes jammed therebetween, detent means in said channel adapted to hold each blank as it is pressed forward by said ram to prevent said blank from being retracted by said ram, a discharge member pivoted to said body and formed with a continuation of said channel therein, detent means in said discharge member to hold the blanks in said continuation normally out of engagement with said work holder, said ram being effective on its forward stroke to press one of said blanks out of said last named detent into engagement with said sliding surface until picked up by said opening, a part of said last named detent being formed to engage said camming surface to move said discharge member as said work holder passes, and biasing means to return said discharge member to its normal position.

5. In combination with a work carrying means for carrying blanks upon which an operation is to be performed and which work carrying means is movable past a fixed position to receive the blanks at that position, means for feeding blanks to said work carrying means including a member formed to provide a slideway in one end thereof and formed with a blank carrying channel extending to the place through which the work carrying means passes, a slide movably disposed in said slideway and formed with a finger extending beyond the slide into said channel and retractably journalled in said slide, spring means for holding said finger in an extended position, an inlet chute for said blanks disposed adjacent said member arranged to discharge through an opening in said member into said channel, said finger being reciprocable by said slide opposite the point of discharge of the chute into the channel, said chute being provided with a wall portion for guiding the blank into the channel which wall portion is pivotally supported and has a lip extending under the blank, spring means for biasing said lip to a predetermined position and positioning said lip to rock in event said blank is engaged by the finger and lip at the same time, said finger being arranged to push said blanks into said channel as they are received from the chute and a movable wall portion in said channel and spring means to move said wall portion in a limited direction into said channel to provide means for frictionally engaging said blanks and hold them under tension in said channel.

6. In a production machine having a plurality of stations, between which forming operations are carried out on workpieces; work holder means comprising a frame built up of a plurality of plates sandwiched together, wrench means disposed in an opening in the center one of said plates, said wrench being formed to provide a workpiece receiving opening, retractable pusher means slidably disposed in relieved slots in said wrench means and at least one of said plates, said pusher means having one end disposed in said workpiece receiving opening, positioning means to control the movement of said pusher means disposed in a relieved opening in one of the side plates being thereby operable in a plane displaced somewhat from said workpiece receiving opening, injector means in the plane of said workpiece opening to inject a workpiece thereinto, and operating means in the plane of said positioning means and displaced from said injector means in the direction of travel of said frame, said operating means being adapted to engage said positioning means to expel a workpiece from said workpiece receiving opening.

7. In a production machine having a plurality of stations between which a workpiece is carried; work holder means comprising a plurality of plates laminated together and movable between said stations, wrench means carried in an opening in one of said plates, said wrench means being formed to provide an opening for receiving a workpiece, the outer edge of said wrench being formed at two levels, a lower level on which the workpiece may slide into said opening, and an upper level, a pusher means slidably disposed in a groove formed in at least one of said plates, one end of said pusher extending into said workpiece receiving opening, said end being formed to fit said workpiece, said pusher being movable between an extended and retracted position, at least a part of said end of said pusher being formed and positioned in the extended position to be a continuation of said lower level, said plate adjacent said wrench means having edges flush with said upper and lower levels, and injector means adapted to press a workpiece resiliently against said edges at the lower level as said wrench means passes the injector station, means engaging the pusher to move it to its extended position as the injector injects the workpiece, retracting means to retract said pusher as said workpiece engages the formed end of the pusher.

8. In a production machine having a plurality of stations between which a workpiece is carried; work holder means comprising a plurality of plates laminated together and movable between said stations, wrench means carried in an opening in one of said plates, said wrench means being formed to provide an opening for receiving a workpiece, the outer edge of said wrench being formed at two levels, a lower level on which the workpiece may slide into said opening, and an upper level, a pusher means slidably disposed in a groove formed in at least one of said plates, one end of said pusher extending into said workpiece receiving opening, said end being formed to fit said workpiece, said pusher being movable between an extended and retracted position, at least a part of said end of said pusher being formed and positioned in the extended position to be a continuation of said lower level, said plate adjacent said wrench means having edges flush with said upper and lower levels, and injector means adapted to press a workpiece resiliently against said edges at the lower level as said wrench means passes the injector station, means engaging the pusher to move it to its extended position as the injector injects the workpiece, retracting means to retract said pusher as said workpiece engages the formed end of the pusher, and means engaging said pusher to move it to its extended position thereby ejecting said workpiece as said wrench means moves to the discharge station.

9. In a metal working machine, a rotary work holder adapted to hold work blanks and carry them through a cycle of operation, means for injecting blanks into said work holder mounted on said machine and having a channel extending therethrough to said work holder, plunger means slidably disposed in said channel, a pivoted inlet member having a blank discharging lip extending to said channel and being formed to provide an inlet passage discharging into said channel at a location such that said plunger retracts to allow a blank to pass from said passageway into said channel and moves forward into engagement with said blank to force it forward in said channel, said inlet member being yieldably biased to a normal position wherein said blank discharging lip thereof extends to said channel and being movable away from said channel by said plunger if one of said blanks comes jammed between said plunger and said inlet member, and an inlet chute discharging into said passageway in said inlet member.

10. In a metal working machine having a plurality of stations between which a workpiece must be carried; a work holding disk structure mounted at its axis for rotation, said structure including a wrench holding plate, wrench means carried in a radial cavity in said plate, said wrench means having a socket in its outer end for receiving a workpiece, the outer edge of said wrench means at one side of said socket being formed to provide a first surface on which the workpiece may slide into said socket, the other edge of said wrench at the other side of said socket being disposed outwardly of said first surface in a radial direction and being adapted to stop said workpiece at said socket, said plate being formed adjacent said wrench means to provide edges forming a continuation of said surfaces at the edges of said wrench means, an injector means pivotally mounted adjacent said edge, means in said injector for releasably engaging and holding a workpiece, means yieldably urging said injector toward the edges of said plate and wrench means at said first surface as said plate moves whereby said workpiece is held in contact with said first surface and is fed into said socket in said wrench means as said socket is rotated past said injector.

11. A work holding disk structure adapted for rotation in a metal working machine comprising a face plate, a spider plate, and a carrier plate fastened between said face plate and spider plate, a movable wrench means mounted in said carrier plate, said wrench means presenting a workpiece receiving socket at the periphery of said carrier plate, a pusher member for said wrench means slidably disposed in grooves formed in said wrench means and said face and carrier plates and having a free end terminating in said socket, operating means for reciprocating said pusher member disposed in a relieved area in said face plate, means for actuating said operating means to move said pusher member to a retracted position to permit entry of a workpiece to said workpiece receiving socket, and means for actuating said operating means to move said pusher to a projected position to eject said workpiece from said socket.

References Cited in the file of this patent
UNITED STATES PATENTS

| | | |
|---|---|---|
| 1,918,290 | Schiltz | July 18, 1933 |
| 1,990,148 | Tevander | Feb. 5, 1935 |
| 1,990,188 | Kabbel | Feb. 5, 1935 |
| 1,999,816 | Lindenmuth | Apr. 30, 1935 |
| 2,067,267 | Goldberg | Jan. 12, 1937 |
| 2,266,864 | Hausknecht | Dec. 23, 1941 |
| 2,324,925 | Hallowell | July 20, 1943 |
| 2,336,478 | Goldberg | Dec. 14, 1943 |
| 2,388,779 | Boehmler | Nov. 13, 1945 |
| 2,395,722 | Buchet | Feb. 26, 1946 |
| 2,405,367 | Nichols | Aug. 6, 1946 |
| 2,607,054 | Williams | Aug. 12, 1952 |
| 2,820,973 | Farmer | Jan. 28, 1958 |
| 2,828,492 | Conner | Apr. 1, 1958 |